(12) United States Patent
Elwart et al.

(10) Patent No.: US 9,037,340 B2
(45) Date of Patent: May 19, 2015

(54) SYSTEM AND METHOD FOR MODIFYING ADAPTIVE CRUISE CONTROL SET POINTS

(71) Applicant: FORD GLOBAL TECHNOLOGIES, LLC, Dearborn, MI (US)

(72) Inventors: Shane S. Elwart, Ypsilanti, MI (US); Aaron L. Mills, Ann Arbor, MI (US); John Shutko, Ann Arbor, MI (US); Thomas Edward Pilutti, Ann Arbor, MI (US); John Ottavio Michelini, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 18 days.

(21) Appl. No.: 13/903,117

(22) Filed: May 28, 2013

(65) Prior Publication Data

US 2014/0288799 A1 Sep. 25, 2014

Related U.S. Application Data

(63) Continuation-in-part of application No. 13/846,969, filed on Mar. 19, 2013.

(51) Int. Cl.
*G07C 5/00* (2006.01)
*G05D 3/00* (2006.01)
*G01S 19/38* (2010.01)
*B60W 40/09* (2012.01)

(52) U.S. Cl.
CPC ............ *B60W 40/09* (2013.01); *B60W 2530/14* (2013.01); *B60W 2550/308* (2013.01); *B60W 2550/402* (2013.01)

(58) Field of Classification Search
USPC ........ 701/32.4, 468–491; 342/357.21–357.78
See application file for complete search history.

(56) References Cited

U.S. PATENT DOCUMENTS

| 5,956,250 | A | 9/1999 | Gudat et al. | |
|---|---|---|---|---|
| 6,012,002 | A | 1/2000 | Tapping et al. | |
| 6,198,996 | B1 | 3/2001 | Berstis | |
| 6,944,533 | B2 | 9/2005 | Kozak et al. | |
| 7,991,549 | B2 | 8/2011 | Kimita et al. | |
| 8,612,107 | B2 | 12/2013 | Malikopoulos | |
| 8,626,568 | B2 | 1/2014 | Warkentin et al. | |
| 8,676,466 | B2 * | 3/2014 | Mudalige | 701/93 |
| 2002/0091473 | A1 * | 7/2002 | Gardner et al. | 701/35 |
| 2005/0102098 | A1 | 5/2005 | Montealegre et al. | |
| 2006/0271246 | A1 | 11/2006 | Bell et al. | |
| 2010/0100310 | A1 * | 4/2010 | Eich et al. | 701/201 |
| 2010/0256835 | A1 * | 10/2010 | Mudalige | 701/2 |
| 2010/0256836 | A1 * | 10/2010 | Mudalige | 701/2 |

(Continued)

FOREIGN PATENT DOCUMENTS

EP 1111336 A1 6/2001
EP 1529695 A1 5/2005

*Primary Examiner* — Thomas G Black
*Assistant Examiner* — Tyler Paige
(74) *Attorney, Agent, or Firm* — Frank A. MacKenzie; Bejin Bieneman PLC

(57) ABSTRACT

A driver performance mapping system for a vehicle system is disclosed. The system may include a GPS receiver generating GPS data indicative of a current location of the vehicle. In addition, the system may also have a radar device generating current gap data indicative of a current gap distance from the vehicle to a lead vehicle. Further, the system may include an electronic controller configured to generate learned gap data based on the current gap data and stored gap data, and then assign the learned gap data with the GPS data.

18 Claims, 5 Drawing Sheets

(56) References Cited

U.S. PATENT DOCUMENTS

| | | |
|---|---|---|
| 2010/0256852 A1* | 10/2010 | Mudalige .................. 701/24 |
| 2011/0166731 A1 | 7/2011 | Kristinsson et al. |
| 2011/0184588 A1* | 7/2011 | Brusilovsky et al. ............. 701/1 |
| 2012/0083960 A1* | 4/2012 | Zhu et al. .................. 701/23 |
| 2012/0253605 A1 | 10/2012 | Denaro |
| 2012/0265433 A1 | 10/2012 | Viola et al. |
| 2012/0271544 A1 | 10/2012 | Hein et al. |
| 2013/0231824 A1 | 9/2013 | Wilson et al. |

\* cited by examiner

SYSTEM AND METHOD FOR MODIFYING ADAPTIVE CRUISE CONTROL SET POINTS

CROSS-REFERENCE TO RELATED APPLICATIONS

This application is a Continuation-in-Part of U.S. Ser. No. 13/846,969, with a filing date of Mar. 19, 2013, which application is hereby incorporated by reference in its entirety.

BACKGROUND

Adaptive cruise control systems ("ACC") for automotive vehicles, which control gap distances between a vehicle and another vehicle ahead of it, are known. These ACC systems typically use a forward-looking radar device, installed behind the grill of the vehicle, to detect the speed and distance of the vehicle ahead of it. Based on these measurements, the ACC systems can automatically adjust the speed of the vehicle to maintain a predetermined distance from the lead vehicle. As one example, if the lead vehicle slows down, or if another object is detected in the vehicle path, the ACC system may send a signal to the engine or braking system to decelerate the vehicle. Then, when the path is clear, the system may accelerate the vehicle back to the set speed and set gap distance.

Further, a typical ACC system may include control switches mounted to a steering wheel to permit a driver to manually adjust the gap distance setting. In this respect, a driver can in real-time manually adjust the settings to provide various gap distances or following distances along the traveled route, such that the entire drive is within the comfort level of the driver. For example, a driver may commute to work along a portion of an interstate freeway having light, high speed traffic and adjust the setting of the ACC system to provide a gap distance of approximately 65 meters based on a speed of 100 kilometers per hour (KPH). In slower, more congested sections of the freeway where, for example, multiple freeways merge together, the driver may readjust the ACC system to provide a gap distance of 30 meters. Accordingly, the driver can manually select multiple predetermined gap distances for respective portions of a route.

SUMMARY

A driver performance mapping system for a vehicle system is disclosed. On embodiment of the driver performance mapping system may include a GPS receiver generating GPS data indicative of a current location of the vehicle. In addition, the system may also have a radar device generating current gap data indicative of a current gap distance between the vehicle and a lead vehicle. Further, the system may include an electronic controller configured to generate learned gap data based on the current gap data and stored gap data, and then assign the learned gap data with the GPS data.

A method of learning and modifying a driver performance set point for a vehicle system is disclosed. One embodiment of the method can include the step of receiving GPS data from a GPS satellite indicative of a current location of a vehicle. The method may also include receiving current gap data from a radar device indicative of a current gap distance from the vehicle to a lead vehicle. In addition, the method may also include generating learned gap data based on the current gap data and stored gap data and then assign the learned gap data with the GPS data.

DETAILED DESCRIPTION

One embodiment of a system and method for modifying and assigning learned gap data and learned speed data to vehicle locations along a currently traveled route is disclosed. The system, in one form, may build and utilize a localized and adaptive map of the route. In particular, the system may be located on the automotive vehicle itself, periodically receive location data for the vehicle from GPS satellites, and selectively store some of the location data based upon certain criteria. The system may store the learned gap data and learned speed data of the vehicle as it travels along the route. In this way, map data and vehicle performance data associated with a particular route traveled by the vehicle can be stored locally with a relatively small amount of electronic storage space. The locally stored map and performance data may be specific to the vehicle that records the data or may be specific to selected drivers who drive the vehicle. The locally-stored map data may be used on subsequent trips by the same vehicle to preview the intended travel path of the vehicle. The locally-stored performance data may be used on subsequent trips in conjunction with an ACC system to adjust the performance of the vehicle as a function of the historical driving habits associated with the vehicle at associated locations along the route. The disclosed method may not be dependent upon pre-defined maps and does not require a communication link to data outside of the vehicle (though it does not exclude the possible use or interaction with such pre-defined maps and/or communication links). Instead, the disclosed system may acquire location data and vehicle performance data specific to the actual drive paths of the vehicle and use such customized data on subsequent trips on the same drive path.

Figure 1:
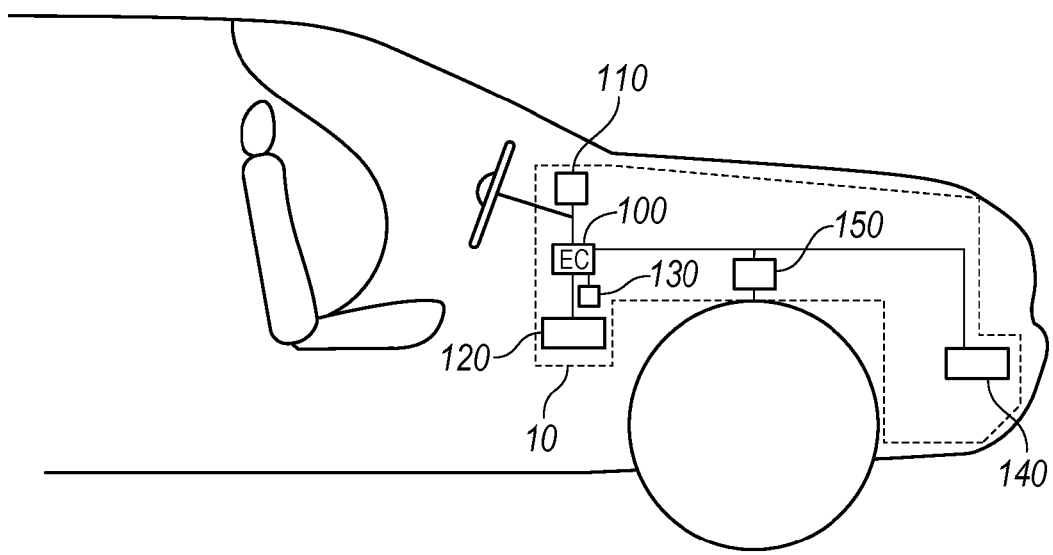
FIG. 1 is a conceptual illustration the components of a driver performance mapping system and an exemplary automotive vehicle environment in which such a driver performance mapping system may be employed.

FIG. 1 illustrates an exemplary automotive vehicle 1 in which a system 10 for building localized maps and modifying ACC set points for historical driving routes may be employed. The system 10 may include at least an electronic controller 100 that is communicatively coupled to at least memory 110, an on-vehicle electronic storage device 120, a GPS receiver 130, a radar device 140 (e.g. a forward looking radar device) and a wheel speed sensor 150. The controller 100 may receive GPS data, which is generated by the GPS receiver 130 and indicative of a current location of the vehicle. In addition, the controller 100 may be configured to receive current gap data, which is generated by the radar device 140 and indicative of a current gap distance from the vehicle to a lead vehicle. The controller 100 may be further configured to receive speed data, which is generated by the wheel speed sensor 150 and indicative of a current speed of the vehicle. However, the controller may receive data generated other various vehicle sensors. The controller may use the GPS data to generate a learned map of routes traveled by the vehicle and further to assign learned gap data and learned speed data with the learned routes, by employing the methods and algorithms described hereinbelow.

Figure 2:
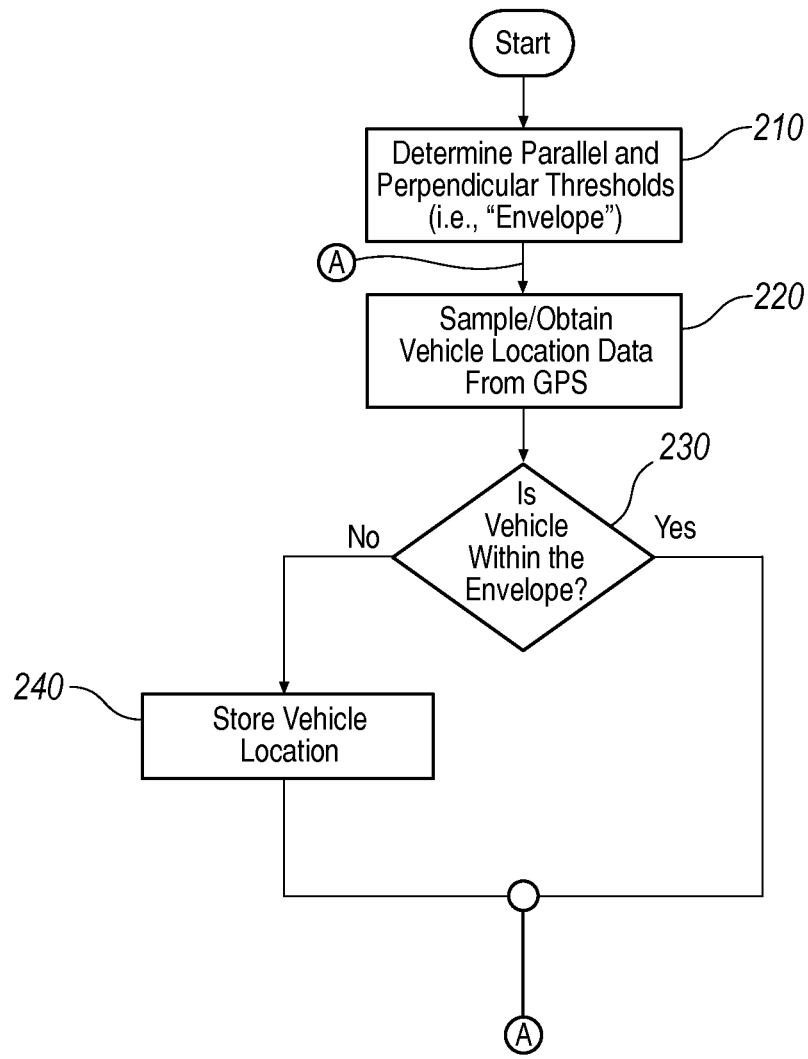
FIG. 2 is a flowchart illustrating exemplary steps in a method to selectively store location data to build a map of a traveled route.
Figure 3:
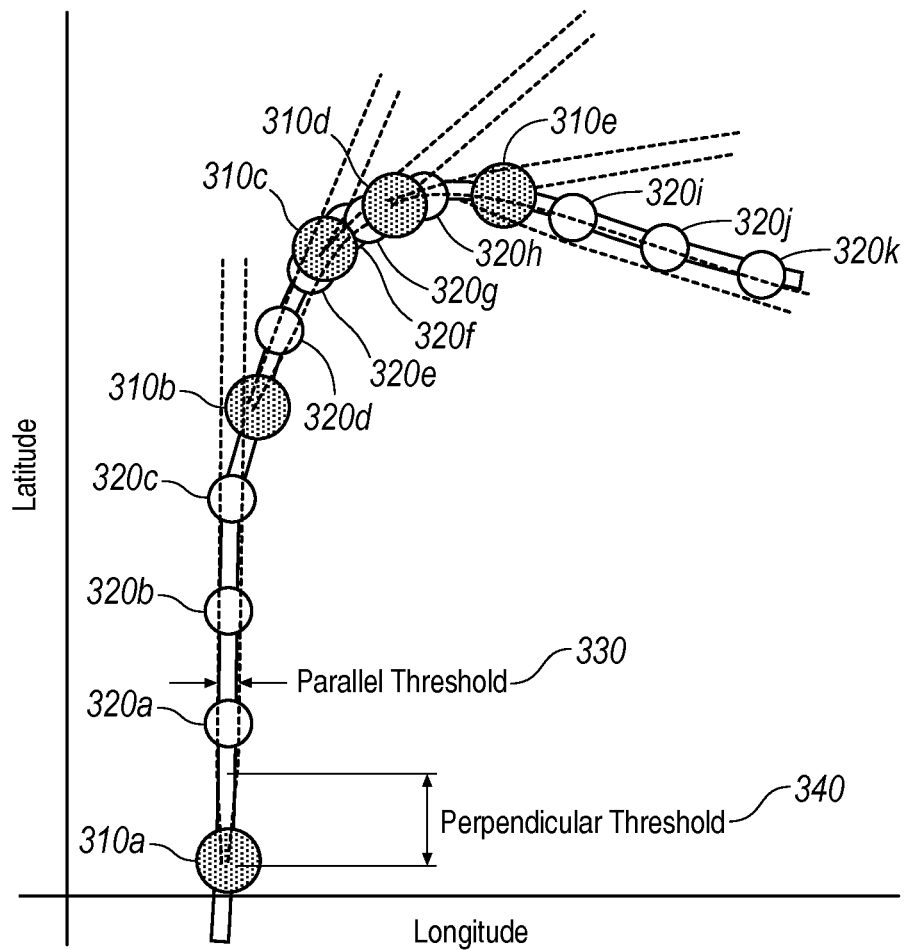
FIG. 3 is a conceptual illustration of the steps shown in the flowchart of FIG. 2.

FIG. 2 illustrates a flowchart setting out the basic functional steps of an algorithm stored in memory 110 and executed by the controller 100 to acquire location data and efficiently build a "map" of a new route being traveled in real-time by the automotive vehicle. FIG. 3 illustrates conceptually and graphically the method illustrated by the flowchart of FIG. 2. With reference to FIG. 3, successive geographic locations on the surface of the Earth are depicted by the circles shown on the Longitude/Latitude graph (altitude not shown). Both the larger solid circles 310a-310e and the smaller circles 320a-320k depict points when the geographic location of the vehicle has been periodically sampled (i.e., longitude and latitude data for the location of the vehicle is acquired from GPS satellites). The longitude/latitude data associated with the larger solid circles 310a-310e may be stored by the system on the storage device 120 for later retrieval and use by the system when the vehicle travels the same path in the future. The data associated with the smaller circles 320a-320k are discarded. The large circles 310a-310e are considered "location nodes", which are later used to identify and define a previously-traveled route by "linking" the location nodes 310a-310e together.

Location node 310a represents the first sampled location data of the vehicle on a new route. Accordingly, the system may store the location data associated with location node 310 as the "head" or starting point of the route. The system may then periodically acquire or sample longitude and latitude data associated with the then-location of the vehicle received from GPS satellites by GPS receiver 130. The system may make a determination to store the currently-sampled location data as a location node (e.g., location nodes 310b-310e) when the sampled location data falls outside of an "envelope" defined by the combination of a parallel threshold and a perpendicular threshold.

The parallel threshold 330 can be a distance between two imaginary parallel lines on opposite sides of the vehicle and between which the vehicle is centered. The direction of the parallel lines at any given moment may be defined by the heading of the vehicle at that moment. For example, the parallel threshold 330 shown in FIG. 3 is shown as oriented in the vertical direction because the heading of the vehicle is in the vertical direction. The value of the parallel threshold 330 (the distance between the dashed lines) may be a pre-defined value or it may be a programmable variable value. The parallel threshold 330 may be virtually any value (e.g., the parallel threshold could be 1 meter, 2 meters, 3 meters, etc.). The perpendicular threshold 340 may be a distance (pre-defined or variable) defined along the heading of the vehicle. For a vehicle traveling in the forward direction, the perpendicular threshold 340 typically starts at a stored location node and extends in front of the vehicle along the heading of the vehicle. For a vehicle traveling in the rearward direction, the perpendicular threshold 340 may start at a stored location node and extend rearward of the vehicle. The value of the perpendicular threshold could be virtually any distance, e.g., 3 meters, 5 meters, 7 meters, etc. Together, the parallel and perpendicular thresholds can define an "envelope" around a traveling vehicle. Location data acquired when the vehicle is inside of the envelope (within the parallel and perpendicular thresholds) may be discarded, which is illustrated in FIG. 3 as small circles 320a-320k. However, when the vehicle goes outside of the envelope (the vehicle goes outside of the parallel or the perpendicular thresholds), then the system may store the current location data on storage device 120 as a location node 310. In this way, location data for the vehicle may be stored as a location node 310 each time the vehicle veers from its current heading by a certain distance, which is detected by the vehicle location exceeding the parallel threshold 330. Location data for the vehicle are also stored as a location node 310 each time the vehicle travels along the same heading (within the parallel threshold) for a defined distance, which is detected by the vehicle location exceeding the perpendicular threshold 340. The stored location nodes 310a-310e may be later used to define the path previously-traveled by this particular vehicle, which can be displayed to the driver on a display screen during a subsequent trip along the same route. The smaller the envelope (i.e., the larger the parallel threshold and/or the perpendicular threshold), the more location nodes 310 that will be stored and the finer the granularity or resolution of the map that will be generated. The larger the envelope, the more coarse the granularity or resolution of the map. Of course, finer granularity or resolution requires a greater amount of storage on storage device 120.

FIG. 2 illustrates steps that may be executed by controller 100 to acquire location data and build the map as described above in connection with FIG. 3. With reference to FIG. 2, the size of the envelope is determined, i.e., the parallel and perpendicular thresholds are determined at step 210. Then, at step 220, the system may sample vehicle location data from GPS satellites. Then, at step 230, the controller 100 may determine, based on the sampled vehicle location data, whether the vehicle is within the envelope. That is, the controller 100 may determine if the vehicle is within the parallel threshold 330 and the perpendicular threshold 340. As indicated above, the values of the perpendicular and parallel thresholds may be pre-determined or variable. If the vehicle is within the envelope, then the algorithm may loop back to step 220 and sample the location of the vehicle again periodically. If, on the other hand, the vehicle is not within the envelope (i.e., outside of the parallel or the perpendicular threshold), then (at step 240), the system may store the current vehicle location data (longitude and latitude data) as a location node 310 on the storage device 120. After storing the location node, the algorithm can loop back to step 220 and sample the location of the vehicle again periodically. The frequency of the sampling may be pre-defined or variable. In this way, a set of location nodes 310 are stored for later retrieval, which can be linked together to define and display the stored route traveled by the vehicle.

The method described above in connection with FIGS. 2 and 3 illustrate a method of building a map of a route traveled by a vehicle in real time and storing it locally on the vehicle, without the need for a pre-defined map acquired from a vendor and without the need for a communication connection to a data source outside of the vehicle. However, the system may instead use a predefined map acquired from a vendor and associate performance data with such map.

Figure 4:
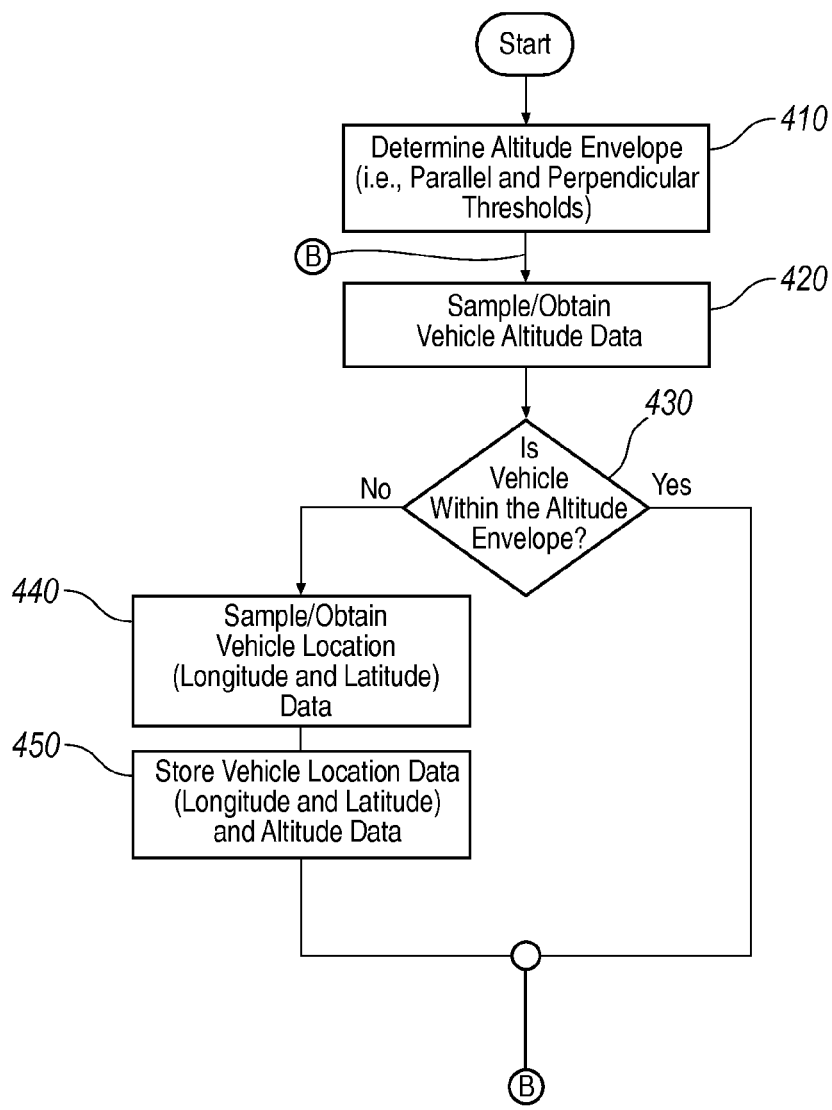
FIG. 4 is a flowchart illustrating exemplary steps in a method to selectively store altitude data to enhance a map of a traveled route.
Figure 5:
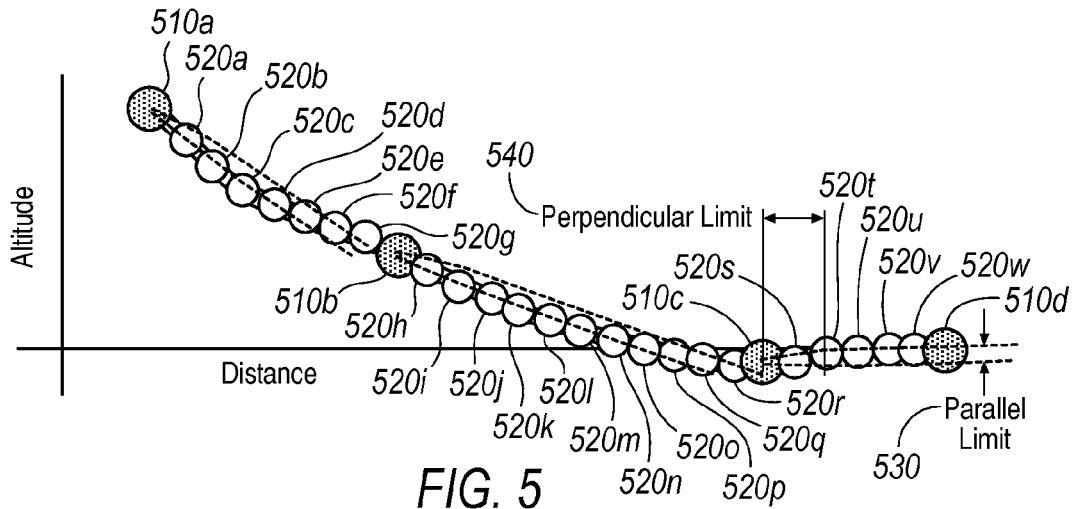
FIG. 5 is a conceptual illustration of the steps shown in the flowchart of FIG. 4.

The two-dimensional map of routes traveled by the vehicle described in connection with FIGS. 2 and 3 above can be enhanced by mapping other characteristics of the traveled route. For example, FIGS. 4 and 5 illustrate a method, consistent with the method described in connection with FIGS. 2 and 3, to store data associated with the altitude of the traveled path, which can later be retrieved by the system to preview to the driver and control systems within the vehicle, such as the ACC system, hills and other changes in surface altitude along the route. FIG. 5 illustrates conceptually and graphically the method of recording altitude data associated with the traveled route. Similar to the previously-described method, the system periodically may sample altitude data for the current location of the vehicle from GPS satellites. The sampled altitude data is depicted in FIG. 5 as the large solid circles 510a-510d and the smaller circles 520a-520w. As above, an envelope around the vehicle may be defined by a parallel threshold 530 and a perpendicular threshold 540, both of which may be pre-defined or variable. The perpendicular threshold 540 may be a from a previous data sample along the heading of the vehicle. The parallel threshold 530 may be a distance between two imaginary parallel lines that extend above and below the vehicle along the vehicle heading. When the system determines that the vehicle has gone outside of the envelope (by exceeding the parallel or the perpendicular threshold), the system can store the altitude data, along with geographic location data for the vehicle, as an "altitude node" 510a-510d on the storage device for later retrieval. The stored altitude nodes 510a-510d can be linked to create an altitude map to display the altitude changes along a previously-traveled route to a driver.

FIG. 4 is a flowchart that illustrates method steps that can be implemented by the controller 100 to build the altitude map described in connection with FIG. 5. At step 410, the system can determine the altitude envelope, defined by the altitude parallel threshold 530 and the altitude perpendicular threshold 540. The parallel and perpendicular altitude thresholds can be pre-defined or variable and may be virtually any value. At step 420, altitude data for the vehicle may be sampled from GPS satellites. At step 430, the controller 100 may determine if the vehicle is within the altitude envelope, i.e., whether the vehicle is within the altitude parallel threshold 530 and within the altitude perpendicular threshold 540. If so, then the algorithm can loop back to step 420 to sample the vehicle altitude data again periodically. The frequency with which the altitude data is sampled may be pre-defined or variable. If the vehicle is outside of the altitude envelope (i.e., outside of the altitude parallel threshold 530 or the altitude perpendicular threshold 540), then (at step 440) the system may acquire geographic data for the vehicle from GPS satellites, which is associated with point at which the vehicle has gone outside of the altitude envelope. Then, at step 450, the system can store the altitude data and the geographic data together on the storage device 120 as a new "altitude node" 510a-510d. Then, the algorithm may loop back to step 420 to sample the altitude data again periodically. These stored altitude nodes may be later retrieved and linked together to generate and preview to a driver the altitude changes (e.g., hills) along the traveled route when the vehicle travels the same route in the future.

Figure 6:
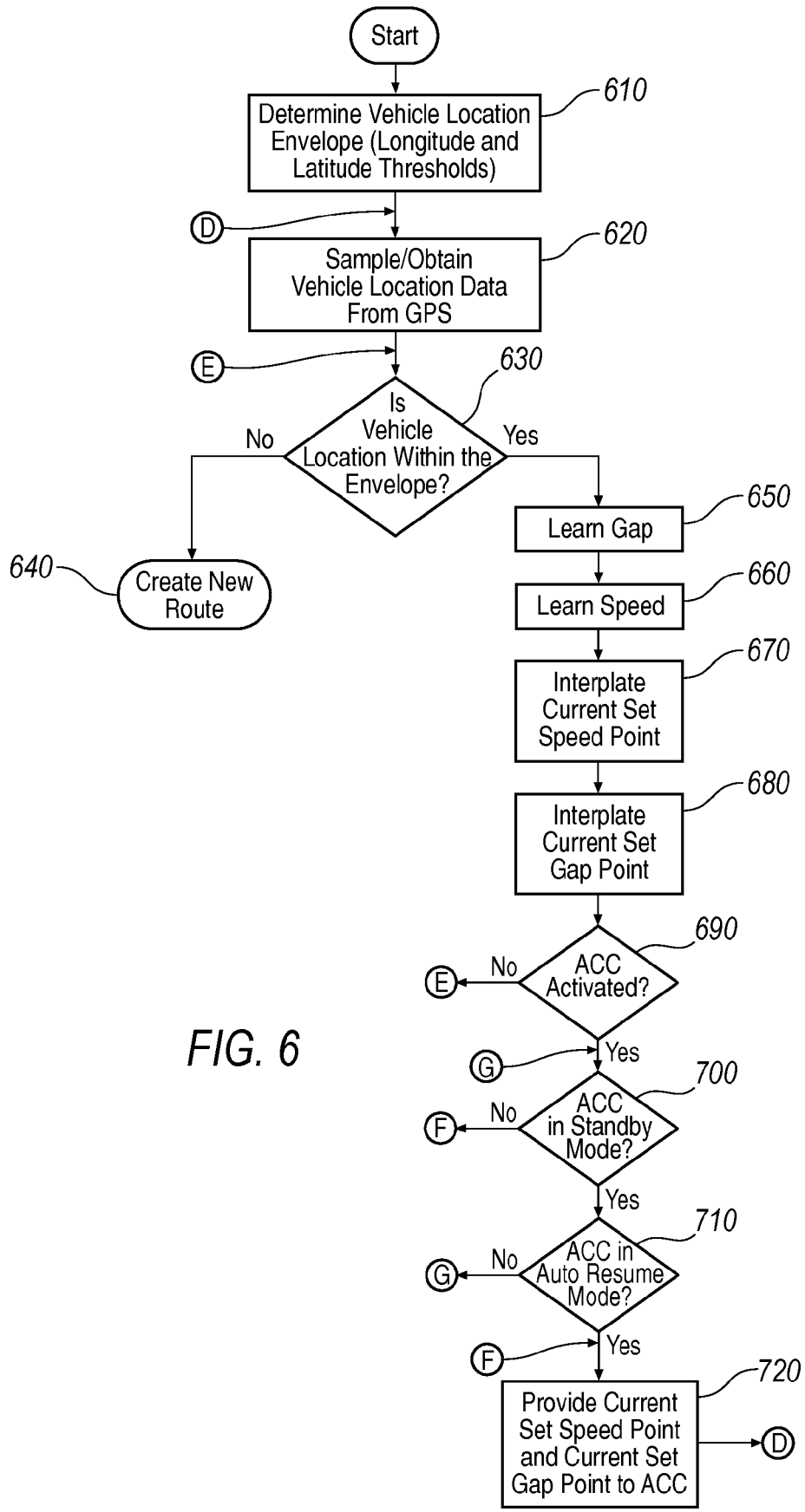
FIG. 6 is a flowchart illustrating exemplary steps in a method to match a currently-traveled route to a previously-stored route of the vehicle, adjust set points for the ACC system and learn new speed and gap distances.

The map generated by the method in FIGS. 2 and 3, whether or not enhanced with altitude data according to the method illustrated in FIGS. 4 and 5, can be further enhanced by associating and storing other data derived during the route traveled by the vehicle. For example, vehicle speed, gap distances from lead vehicles and other performance data may be associated and stored, which can later be used to control or adjust various vehicle systems, including ACC systems based on historical driving patterns, when the vehicle is driven on a route that has been previously "learned." Other data associated with the route may also be acquired. Collectively, data that is acquired and associated with a learned map is referred to as data associated with a "variable of interest." Such data may be acquired from various known sensors and systems incorporated into the vehicle according to known methods. FIG. 6 illustrates how any data associated with any desired variable of interest can be acquired, stored and associated with a map.

FIG. 6 is a flowchart that illustrates a method of using stored data associated with a previously-learned route to modify various set points for operating the ACC system along previously learned routes.

At step 610, a vehicle location matching envelope may be determined, which, in this case, includes a latitude threshold and a longitude threshold, which may be pre-defined or variable. The dimensions of the location matching envelope can be independent of the dimensions of the earlier-described location envelope used for learning a route (described in connection with FIGS. 2 and 3). For purposes of this method, the location matching envelope is used to determine if the current location of the vehicle is sufficiently near an existing stored location node. That is, if the longitude and latitude data of the current location of the vehicle are within the latitude threshold and the longitude threshold (i.e., the location envelope) of a previously-learned location node, then the system matches the current location to the previously-learned location node. To that end, at step 620, the system may sample the vehicle location by receiving location data from GPS satellites. At step 630, the controller 100 may determine if the sampled current vehicle location is within the location envelope, i.e., within the latitude threshold and the longitude threshold, of a previously-learned location node. If not, the method continues to step 640. However, if so, the method proceeds to step 650.

At step 640, the system 10 can store the vehicle location as a new location node. The system may also store a new gap set point and a new speed set point associated with the new node. However, the system may instead utilize set points for speed and gap distance associated with the immediately preceding node.

At step 650, the system 10 may update gap data associated with the nodes along the previously-traveled route. In particular, this step may be initiated by determining that a predetermined threshold has been satisfied. For example, the controller may receive GPS data from the GPS receiver, indicative that the vehicle is substantially close to a node, such as being located less than 1% of the distance from node 310a to node 310b. The controller 100 may then further receive current gap data from the radar device and stored gap data from the storage device. The controller 100 may calculate the learned gap data, based on the current gap data and stored gap data so as to provide the updated gap set point. The controller may then assign the learned gap set point to the corresponding GPS data. As one example, the controller 100 may calculate the learned gap data is the sum of 10% of a current gap distance of 70 meters and 90% of the stored or previously-learned gap distance of 50 meters at node 310a, so as to provide an updated gap set point of 52 meters at node 310a. The learned gap data may be stored on the storage device and utilized in conjunction with the ACC system as described below for steps 670 and thereafter, in the next trip along this route.

At step 660, the controller 100 may update speed data associated with the nodes along the previously-traveled route. In particular, the controller may receive the current speed data from the wheel speed sensor and the stored speed data from the storage device. The controller may then calculate the learned speed data, based on the current speed and the stored speed so as to provide the learned speed data. The controller may then assign the learned speed data to the corresponding GPS data. For example, the controller 100 may calculate the learned speed data as the sum of 10% of the current speed of 95 KPH and 90% of the stored or previously-learned speed of 110 KPH at the node 310a, so as to provide an updated speed set point of 108.5 KPH at node 310a. The learned speed data may be stored on the storage device and utilized in conjunction with the ACC system as described below for steps 670 and thereafter, in the next trip along this route.

At step 670, the controller 100 may in real-time interpolate the speed set point between consecutive nodes along the historical driving route. In particular, the controller may calculate the speed set point based on the previously-learned speeds at the nodes 310a, 310b, and further based on the distance of the vehicle with respect to those nodes. Continuing the previous example, the vehicle may be located less than 1% of the distance from node 310a to node 310b. The previously-learned speeds at nodes 310a, 310b may be 110 KPH and 80 KPH, respectively. Accordingly, the controller may calculate the speed set point as the sum of 1% of 110 KPH and 99% of 80 KPH, so as to provide an interpolated speed set point of 109.7 KPH.

Similarly, at step 680, the controller 100 may interpolate the gap set point between consecutive nodes along the historical driving route. To continue the example above, the vehicle may be located less than 1% of the distance from node 310a to node 310b. The previously-learned gaps at nodes 310a, 310b may be 50 meters and 70 meters, respectively. Accordingly, the controller may interpolate the current gap set point by adding 99% of 50 meters to 1% of 70 meters, such that the current gap set point for the ACC system may be 50.2 meters. This interpolation may permit the ACC system to gradually operate the vehicle without sudden acceleration or braking.

At step 690, the controller 100 may determine whether the ACC system 10 has been actuated by the driver to provide automated speed and gap control. If not, the method returns to step 620. If so, however, the method continues to step 700.

At step 700, the controller 100 may determine whether the ACC system has been disposed in a standby mode. If not, the method immediately continues to step 720. If, however, the ACC system is in the standby mode, the method proceeds to step 710.

At step 710, the controller 100 may determine whether an auto resume function of the ACC system has been activated. If not, the method may return to step 620. However, if the auto resume mode function has been activated, the method may continue to step 720.

At step 720, the controller 100 may provide the current set points for vehicle speed and gap distance to the ACC system, so as to permit the ACC system to control vehicle devices, such as a throttle body and/or braking mechanism. To continue the example above, the ACC system may use the current gap set point of 50.2 meters in the next trip along the same route. However, if the controller 100 determines that the vehicle is traveling into a new location envelope and therefore along a route not previously traveled by the vehicle, the controller may assign the previously-learned gap set point to the new node. Similarly, if the controller 100 determines that the vehicle is traveling into a new location envelope, the controller may assign the previously-learned speed set point to the new node.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A driver performance mapping system for a vehicle, comprising:
    a GPS receiver generating GPS data indicative of a current location of the vehicle;
    a radar device generating current gap data indicative of a current gap distance from the vehicle to a lead vehicle; and
    an electronic controller programmed to generate learned gap data based on the current gap data and stored gap data, associate the learned gap data with the GPS data, and apply the learned gap data in accordance with the current location of the vehicle,
    wherein the controller determines the learned gap data based on the current gap distance and a stored gap distance derived from the stored gap data, and wherein the controller determines the learned gap data based on a sum of a first percentage of the current gap distance and a second percentage of the stored gap distance.

2. The driver performance mapping system of claim 1, further comprising:
    an on-vehicle electronic storage device electronically communicating with said controller;
    wherein said controller is programmed to:
        receive the stored gap data from the storage device; and
        store the learned gap data on the storage device.

3. The driver performance mapping system of claim 1, wherein the controller is programmed to interpolate a set gap distance for the vehicle in one location between two stored locations based on the current location of the vehicle with respect to the first and second locations and learned gap data associated with each of the first and second locations.

4. The driver performance mapping system of claim 1, wherein the radar device is a forward looking radar attached to a front end structure of the vehicle.

5. The driver performance mapping system of claim 1, comprising:
    a wheel speed sensor generating current speed data indicative of a current speed of the vehicle; and
    an electronic controller programmed to generate learned speed data associated with the GPS data, the current speed data and stored speed data.

6. The driver performance mapping system of claim 5, wherein the controller determines the learned speed data based on a sum of a first percentage of the current speed and a second percentage of a stored speed derived from the stored speed data.

7. The driver performance mapping system of claim 5, wherein said controller is further programmed to:
  receive the stored speed data from the storage device; and
  store the learned speed data on the storage device.

8. The driver performance mapping system of claim 5, wherein the controller is programmed to interpolate a set speed for the vehicle in one location between two stored locations of a traveled route based on the current location of the vehicle with respect to the first and second locations and learned speed data associated with each of the first and second locations.

9. The driver performance mapping system of claim 5, wherein the controller is programmed to electronically communicate with an adaptive cruise control system that at least one of adjusts the current speed of the vehicle based on the learned speed data and adjusts the current gap distance based on the learned gap data.

10. The driver performance mapping system of claim 1, wherein said controller is further programmed to store the GPS data on the storage device if the location of the vehicle is outside of a location envelope.

11. The driver performance mapping system of claim 10, wherein said controller is further programmed to determine that the learned gap data and the learned speed data is a previously learned gap data and a learned speed data, respectively, stored on the storage device, if the vehicle is outside of a location envelope.

12. The driver performance mapping system of claim 11, wherein said location envelope comprises:
  a parallel threshold, which is a value that defines a distance between two imaginary parallel lines centered around opposite sides of the vehicle and aligned with the heading of the vehicle; and
  a perpendicular threshold, which is a value that defines a distance along the heading of the vehicle.

13. The driver performance mapping system of claim 12, wherein said controller is further programmed to match a currently-traveled route of the vehicle to a previously-traveled route of the vehicle.

14. The driver performance mapping system of claim 13, wherein said controller is programmed to match the currently-traveled route of the vehicle to the previously-traveled route of the vehicle by:
  (i) receiving the GPS data indicative of the current location of the vehicle; and
  (ii) determining if the current location of the vehicle is within a location matching envelope relative to previously-stored GPS data.

15. A method of modifying a driver performance set point, comprising the steps:
  receiving GPS data from a GPS satellite indicative of a current location of a vehicle;
  receiving current gap data from a radar device indicative of a current gap distance from the vehicle to a lead vehicle;
  generating learned gap data based on the current gap data and stored gap data, wherein the learned gap data is based at least in part on a sum of a first percentage of the current gap distance and a second percentage of the stored gap distance;
  associating the learned gap data with the GPS data; and
  applying the learned gap data in accordance with the current location of the vehicle.

16. The method of claim 15, further comprising:
  generating current speed data indicative of a current speed of the vehicle; and
  generating learned speed data associated with the GPS data, the current speed data and stored speed data.

17. The method of claim 16, further comprising storing at least one of learned gap data and learned speed data on an on-vehicle electronic storage device.

18. The method of claim 17, further comprising
  determining the learned speed data based on the current gap distance and the stored speed from the stored speed data; and
  associating at least one of said learned gap data and said learned speed data with stored GPS location data corresponding to a point along a previously-traveled route.

* * * * *